(12) United States Patent
Bordes et al.

(10) Patent No.: US 6,535,555 B1
(45) Date of Patent: Mar. 18, 2003

(54) QUANTIZING METHOD AND DEVICE FOR VIDEO COMPRESSION

(75) Inventors: Philippe Bordes, Pont-Pean (FR); Pierre Ruellou, Domloup (FR)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/719,883

(22) PCT Filed: Apr. 21, 2000

(86) PCT No.: PCT/FR00/01057

§ 371 (c)(1),
(2), (4) Date: Dec. 19, 2000

(87) PCT Pub. No.: WO00/65843

PCT Pub. Date: Nov. 2, 2000

(30) Foreign Application Priority Data

Apr. 26, 1999 (FR) .............................. 99 05337

(51) Int. Cl.[7] .............................. H04B 1/66; G06K 9/36; H04N 7/12
(52) U.S. Cl. .............................. 375/240.04; 375/240.22; 382/251; 348/420.1
(58) Field of Search ........................ 375/240.03, 240.05, 375/240.04, 240.16, 240.24, 240.19, 240.22; 382/232, 236, 239, 251; 348/699, 405.1, 420.1, 387.1, 390.1

(56) References Cited

U.S. PATENT DOCUMENTS

| | | | | |
|---|---|---|---|---|
| 5,686,962 A | * | 11/1997 | Chung et al. | 375/240.16 |
| 6,028,896 A | * | 2/2000 | Jang et al. | 375/240.04 |
| 6,078,689 A | * | 6/2000 | Kunitake | 382/232 |
| 6,160,846 A | * | 12/2000 | Chiang et al. | 375/240.05 |
| 6,181,745 B1 | * | 1/2001 | Mayer | 375/240.03 |
| 6,243,497 B1 | * | 6/2001 | Chiang et al. | 382/251 |
| 6,278,735 B1 | * | 8/2001 | Mohsenian | 375/240 |

FOREIGN PATENT DOCUMENTS

| | | | |
|---|---|---|---|
| EP | 0541302 | 5/1993 | H04N/7/13 |
| EP | 0618733 | 10/1994 | H04N/7/133 |
| GB | 2306846 | 5/1997 | H04N/5/14 |
| WO | 97/37322 | 10/1997 | G06K/9/36 |
| WO | 98/37701 | 8/1998 | H04N/7/32 |

* cited by examiner

Primary Examiner—Gims S. Philippe
(74) Attorney, Agent, or Firm—Joseph S. Tripoli; Joseph J. Laks; Ronald H. Kurdyla

(57) ABSTRACT

The invention concerns a method comprising a step which consists in a quantizing step relative to a pixel or group of pixels in accordance with a desired rate. The invention is characterized in that it comprises an additional step which consists in modifying the quantizing step on the basis of an information of a subjective nature concerning said pixel or group of pixels. The invention is applicable to compression of video images.

12 Claims, 1 Drawing Sheet

QUANTIZING METHOD AND DEVICE FOR VIDEO COMPRESSION

BACKGROUND OF THE INVENTION

1. Field of the Invention

The invention relates to a quantization process and device for video compression. It is more particularly applied to video coding according to the ISO/IEC MPEG2 standard.

2. Description of the Related Art

Video compression processes carry out a quantization operation in the coding chain. This quantization is generally applied to blocks of coefficients arising from a cosine transform.

The slaving of the quantization interval to the output bit rate from the coder makes it possible in particular to regulate this bit rate. The image quality obtained by a coder at given bit rate is in large part related to this regulating policy. Specifically, one simultaneously requires a quantization interval which is large enough not to exceed the fixed bit rate but small enough to limit the coding artefacts of the block effect type. Moreover, big variations in quantization interval within the image cause defects of the "beating" type and regulation therefore attempts to stabilize the interval used to the maximum possible extent.

Regulation is based on an objective criterion which is generally the cost of coding the quantized block. If the costs of the previously quantized blocks deviate excessively from the average cost permitted in order to comply with the target bit rate then the quantization interval will increase, in the converse case it will decrease. These variations take no account of the type of the area currently being coded and this may give rise to subjective defects. Specifically, the eye is more or less sensitive to defects depending on the content of the coded sequence. In an area of strong motion the defects will be less visible than in a uniform, stationary area for example.

SUMMARY OF THE INVENTION

The aim of the invention is to alleviate the aforesaid drawbacks.

The subject is a quantization process for video data compression comprising a step of calculating a quantization interval relating to a pixel or group of pixels as a function of a desired bit rate, characterized in that it comprises an additional step of modifying the quantization interval as a function of a subjective quality cue relating to this pixel or group of pixels.

In particular, the quality cue is of the JND type (Just Noticeable Difference).

A variant of the invention consists in the cue being averaged in blocks of pixels.

Another variant of the invention consists in the cue relating to a block being filtered in a window around this block.

Another variant of the invention consists in the cue being weighted by a subjective quality cue averaged over the image.

Another variant of the invention consists in the per-pixel subjective quality cue being provided on the basis of a subjective evaluation process generating a degraded image. The degraded image can be the local decoded arising from a previous coding of the corresponding reference image.

Other variants of the invention consist in the degradation of the image being obtained by making the reference image noisy with the aid of Gaussian noise or else by making the reference image noisy with the aid of transform, quantization, inverse transform and inverse quantization operations.

Another variant consists in the quantization interval used for the quantization and inverse quantization operations being that used during the coding of a previous image.

Another variant consists in the quantization interval used for the quantization and inverse quantization operations being that used during a preanalysis of the image.

The invention also relates to a device for implementing the process.

BRIEF DESCRIPTION OF THE DRAWINGS

The characteristics and the advantages of the present invention will emerge better from the following description given by way of example and with reference to the appended figures in which.

DETAILED DESCRIPTION OF THE INVENTION

Figure 1:
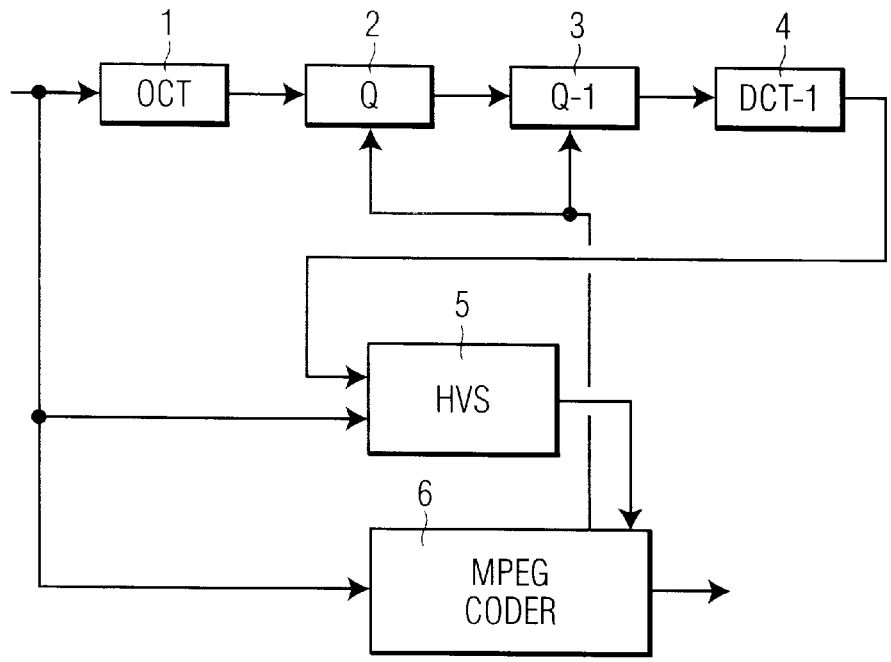
FIG. 1 represents a quantization device for MPEG coder.

The idea of the invention is to modulate the quantization interval proposed by the regulation as a function of a subjective quality criterion. By virtue of the invention, for a given bit rate, the overall quality of the image is improved: by degrading the areas where the viewer is less sensitive to the quality of the image and by improving the areas where he is more sensitive to this quality, therefore at constant bit rate and on account of compensations, the subjective quality of the image is improved.

The criterion is provided by a psychovisual model. For example, such a model carries out a subjective evaluation of an image, in general the decoded image, with respect to a reference image, in general the source image, and proposes a location of the areas which are most sensitive to defects.

In the case of video coding, this model needs to be provided with the source image on the one hand and a degraded image on the other hand since the corresponding decoded image is not yet available (a priori coding).

This degraded image will be obtained by applying the DCT, Quantization, inverse Quantization and inverse DCT operations (used in the coder) to the source, in such a way as to have defects much like those of the video coding. The quantization interval used can be the average interval used during the coding of the previous image, thereby making it possible to get somewhat closer to reality. If an INTRA preanalysis is performed by the coder, he interval used can then be that used during this preanalysis.

However, other ways of generating the degraded image can be envisaged, for example:

by adding Gaussian noise to the source, by directly using the local decoded arising from the first coding, within the context of a 2-pass coding, the first pass making it possible to optimize the second.

Once the 2 images are available, the psychovisual model gives us a cue of JND type, according to the acronym for the expression Just Noticeable Difference, connecting the per-pixel error to a subjective perception defect. This cue is for example an image, the luminance values of the constituent pixels of which are replaced by values representing the level of perception of the defect by the human eye.

This per-pixel cue will initially be referred to a per-macroblock cue (in general an area of 16*16 pixels) which is the video coding unit:

$$\text{JND\_MB}(k, l) = \frac{\sum_{i=0}^{M-1} \sum_{j=0}^{N-1} \text{JND\_pixel}(k*M+i, l*N+j)}{M*N}$$

Each macroblock consists of N lines and of M pixels per line. The image being chopped into macroblocks, the letters k and l respectively represent the column number and the line number of the macroblock MB(k,l) in the image.

This cue is then filtered in a window of size F, for example one macroblock either side of the processed macroblock, in the two directions, so as to avoid excessively numerous variations of quantization interval from one macroblock to another. In fact this gives rise to a not inconsiderable excess coding cost.

The value JND_MB is therefore averaged over a window of F macroblocks on either side of the processed macroblock, through the following formula:

$$\text{JND\_Fil}(k, l) = \frac{\sum_{u=k-F}^{k+F} \sum_{v=l-F}^{l+F} \text{JND\_MB}(u, v)}{(2*F+1)^2}$$

Finally, this local criterion is compared with the average value of JND over the image, Mean_JND, in such a way as to take account of the overall quality of the image in the quantization:

$$\text{Mean\_JND} = \frac{\sum_{u=0}^{SI-1} \sum_{v=0}^{MB-1} \text{JND\_MB}(u, v)}{SI*MB}$$

MB is the number of macroblocks per slice (to use the MPEG terminology),

SI is the number of slices in an image.

The criterion for weighting the quantization interval is the following:

Δ=*JND_Fil–Mean_JND*

When the sensitivity to defects is higher locally than on average in the image, that is to say when Δ is positive, then the quantization interval is decreased, for example according to the relation:

Q_MB=Q_regulation−Min(0.3*Q_regulation,Δ$^2$)

Q_MB is the quantization interval allotted to the macroblock MB, that is to say after modification taking into account the weighting criterion.

Q_regulation is the quantization interval which was calculated initially by the coder regulating circuits, that is to say the quantization interval allocated to the macroblock before modification.

Hence, here the "quality deviation" squared, as long as this value is less than 0.3 times the original interval, is subtracted from the proposed quantization interval. Choosing the minimum value between Δ$^2$ and 0.3×Q_regulation amounts to permitting a maximum decrease of ⅓ of the original interval.

A variant of the invention consists in performing the comparison, not by subtracting the average value of JND from the filtered value but by forming the quotient of the filtered value with the average value.

$$\alpha = \frac{\text{JND\_Fil}(k, l)}{\text{Mean\_JND}}$$

If the value JND_Fil(k,l) of macroblock k,l is close to the value Mean_JND, it is not necessary to make a correction, the defects being neither more nor less visible in this area corresponding to macroblock MB(k,l) than on average in the image.

If the value JND_Fl(k,l) is greater than the value Mean_JND, this signifies that in this area the viewer will be more sensitive to defects and it is then judicious to decrease the quantization interval proposed by regulation.

If JND_Fil is less than Mean_JND, the viewer will be less sensitive to defects in this area and consequently an increase in the quantization interval may be envisaged.

Before applying the above coefficient α it is preferable to bound it between values BOUND_INF and BOUND_SUP so as to avoid excessively large variations of the quantization interval. Indeed big variations may give rise to an instability in the regulating algorithm.

The quantization interval proposed by regulation is therefore corrected in the following way:

$$\text{Q\_MB} = \frac{\text{Q\_regulation}}{\text{MAX(BOUND\_INF, MIN}(\alpha, \text{BOUND\_SUP}))}$$

The algorithm relating to the first solution avoids there being excessively numerous changes of quantization interval. Subjectively it is observed that, in the sensitive areas, the quantization interval has indeed decreased, improving the definition.

As far as the regulating algorithm is concerned, it is less disturbed than that corresponding to the proposed variant, promoting greater stability of the signal-to-noise ratio PSNR, the acronym standing for the expression Peak Signal Noise Ratio.

In a more general manner, these algorithms enable the quantization interval to be varied locally based on subjective quality criteria. They can be used in any video coder and are compatible with the existing bit rate control algorithms. Thus, the image coding cost is apportioned according to a subjective criterion making it possible to allot more bits to the areas most sensitive to defects from the viewer's standpoint.

FIG. 1 represents a device implementing the process described above, should the degraded image be obtained by applying the DCT, Quantization, inverse Quantization and inverse DCT operations to the source.

The source image successively feeds a discrete cosine transform coder 1, a quantizer 2, an inverse quantizer 3 and an inverse discrete cosine transform coder 4. The image thus obtained referred to as the degraded image is then applied to an HVS processing circuit 5 which receives, on a second input, the source image. The source image is also transmitted to an MPEG type coder 6. This MPEG coder receives, on a second input, the cues originating from the HVS processing circuit 5. The quantizer 2 and the inverse quantizer 3 also receive cues from the MPEG coder 6. The output from the MPEG coder provides the compressed data from coding the source image.

The cues received by the DCT coder are source image block cues, the image being initially split into image blocks with the aid of circuits which are not represented in the figure. The image blocks undergo a DCT type coding by way of the circuit 1. The coefficients corresponding to the data blocks thus transformed are then quantized by way of the quantization circuit 2 then dequantized by way of a dequantization circuit 3. The quantization interval used is for example the quantization interval calculated by the MPEG coder 6 for the coding of the corresponding block of the previous image. The block of dequantized coefficients is finally transmitted to an inverse decoding circuit DCT-1 carrying out the transform inverse to that of the circuit 1. The blocks obtained correspond to the degraded image and are transmitted to the HVS processing circuit 5.

This circuit 5 receives the blocks of the source image and those of the degraded image. Once it has received the blocks of the complete image, it implements a calculation algorithm so as to provide a JND type cue, that is to say a cue relating, for each of the blocks and hence for the corresponding area, to the sensitivity of the viewer to defects in the image, in the area corresponding to the relevant block.

This algorithm is for example based on masking functions (filters) modelling the behaviour of the human visual system. Each function indicates whether the difference between the two input images is or is not perceptible, in relation to the behaviour which it models (masking due to contrast, to high luminance or not, to texture, to motion, etc.). The combining of these functions makes it possible to obtain an image, the intensity of each pixel of which is proportional to the visibility of the error in the relevant image.

This cue is transmitted, for each image block, to the MPEG coder 6 which, after having calculated the quantization interval for a block according to the conventional regulating algorithms, modifies this calculated value as a function of this JND type cue. It is this modified value which is used by the coder to carry out the quantization of the coefficients of the block. At its output, the coder provides compressed digital data corresponding to the MPEG coding.

Figure 2:
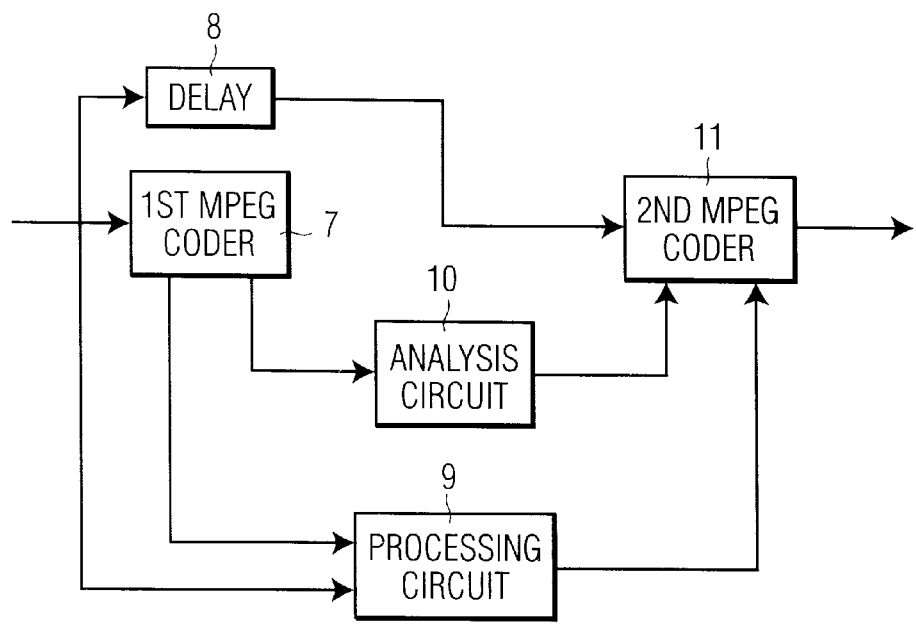
FIG. 2 represents a variant of the quantization device for MPEG coder.

A variant of the invention is represented in FIG. 2.

The source image is transmitted in parallel to the input of a first MPEG coder 7, of a delay circuit 8 and of a processing circuit 9. The first MPEG coder transmits, on a first output, a local decoded image to a second input of the processing circuit 9 and, on a second output, data relating to the compression performed to an analysis circuit 10. The output of this circuit 10 is linked to a first input of a second MPEG coder 11. The output of the delay circuit 8 is linked to a second input of the second coder 11. The output of the processing circuit is linked to a third input of the second coder 11. The output of this second coder is the output of the compressed data.

The source image is therefore transmitted to a first coder 7 of MPEG type. The first output of this coder provides the local decoded, that is to say the reconstructed image which makes it possible, in the coder, to perform differential coding of the current image with respect to this reconstructed previous image referred to as the local decoded. This image is reconstructed since it is the image coded by cosine transformation and quantization, according to the MPEG standard, then decoded by the inverse operations. The processing circuit 9 compares the source image with the local decoded which is the degraded image. This processing circuit provides the second coder with a grey image, the intensity of each pixel of which is proportional to the visibility of the error in the relevant image, as indicated hereinabove.

The second MPEG coder 11 also receives the cues arising from the analysis circuit of the first pass. This analysis circuit processes for example cues relating to the cost of coding the images during the first pass, to the motion vectors so as to compile histograms of motion vector fields, calculate the apportioning of the bit rates over an image or a group of images etc. These data are transmitted to the second coder which utilizes them to decide the type of coding of the images, for the calculation of the quantization interval etc.

The delay circuit 8 makes it possible to delay the transmission of the images as a function of the image analysis time. This time is related to the number of images analysed on each occasion, for example a group of images (GOP). The second coder 11 therefore codes these delayed images as a function of the cues originating from the analysis circuit 10 and the processing circuit 9, the quantization interval being modified as a function of these data.

These are exemplary embodiments and of course any type of circuit making it possible to obtain degraded images can be used without departing from the field of the invention.

What is claimed is:

1. Process for the on-line coding of a sequence of video images together with data quantization comprising a step of calculating a quantization interval (6, 11) relating to a current image as a function of a desired bit rate and of a subjective quality cue (5, 9), characterized in that the current image is processed so as to obtain a corresponding degraded image, comparison of which with the current image is made to calculate the subjective quality cue and in that the current image is also delayed (8) during this processing so as to perform coding thereof as a function of this subjective quality cue and so as to perform the coding of a previous image during the calculation of this subjective quality cue for the current image.

2. Process according to claim 1, wherein the quality cue is of the JND type (Just Noticeable Difference).

3. Process according to claim 1, wherein the cue calculated for a block of pixels is the cue calculated for each pixel of the block of pixels averaged over the block.

4. Process according to claim 3, wherein the cue relating to a block is filtered in a window around this block.

5. Process according to claim 3, wherein the cue is weighted by a subjective quality cue averaged over the image.

6. Process according to claim 1, wherein the degradation is obtained by making the reference image noisy with the aid of Gaussian noise.

7. Process according to claim 1, wherein the degradation is obtained by making the reference image noisy with the aid of transform, quantization, inverse transform and inverse quantization operations.

8. Process according to claim 7, wherein the quantization interval used for the quantization and inverse quantization operations is that used during the coding of a previous image.

9. Process according to claim 7, wherein the quantization interval used for the quantization and inverse quantization operations is that used during a preanalysis of the image.

10. Process according to claim 1, wherein the degraded image is the local decoded arising from a previous coding of the corresponding reference image.

11. Device for the on-line coding of a sequence of video images comprising an MPEG 2 type coder for the coding of a source image, wherein it also includes a coding and decoding circuit receiving the source image so as to calculate a degraded image, a processing circuit receiving the source image and the degraded image for calculating a per-pixel or per-block quality cue relating to a pixel or block of pixels of the source image by comparing the images, so as to provide the coder with quality cues, a circuit for storing at least one image receiving the source image so as to transmit a delayed image to the coder, the coder coding the delayed image according to a per-pixel or per-block quantization interval calculated as a function of the corresponding per-pixel or per-block quality cue relating to the source image.

12. Device according to claim 11, wherein the coding and decoding circuit comprises a DCT coding circuit, a quantization circuit, an inverse quantization circuit, an inverse DCT coding circuit for providing the degraded image.

* * * * *